United States Patent [19]

Praznovsky et al.

[11] 3,819,512

[45] June 25, 1974

[54] PURIFICATION OF EFFLUENT CONTAINING ORGANIC MATTER

[75] Inventors: Istvan Praznovsky; Imre Gyulavari, both of Debrecen, Hungary

[73] Assignee: Nikex Nehezipari Kulkereskedelmi Vallalat, Budapest V., Hungary

[22] Filed: Dec. 9, 1971

[21] Appl. No.: 206,381

[52] U.S. Cl. .................................. 210/8, 210/15
[51] Int. Cl. .................................. C02c 1/02
[58] Field of Search .................. 210/3–9, 14, 210/15, 11, 195

[56] References Cited
UNITED STATES PATENTS

| | | | |
|---|---|---|---|
| 3,485,750 | 12/1969 | Albertson | 210/8 |
| 3,714,036 | 1/1973 | Slater | 210/253 X |

*Primary Examiner*—Samih N. Zaharna
*Assistant Examiner*—Peter A. Hruskoci
*Attorney, Agent, or Firm*—Blum, Moscovitz, Friedman & Kaplan

[57] ABSTRACT

Domestic and/or industrial effluent containing biodegradable organic impurities is passed consecutively through an auxiliary stabilizing tank and an aerobic stabilizing tank, in the latter of which the effluent is subjected to oxidation by oxygen produced by photosynthesis. A portion of the effluent is recycled from the aerobic stabilizing tank to the auxiliary stabilizing tank. A preferred region from which the effluent is to be recycled and a preferred period during which effluent is to be recycled are given.

11 Claims, 4 Drawing Figures

PURIFICATION OF EFFLUENT CONTAINING ORGANIC MATTER

BACKGROUND OF THE INVENTION

As the population of the earth increases and as industrial production increases, the importance of biological effluent purification also increases. Generally, effluent purification apparatus is designed to degrade impurities only to the so-called first stage, i.e., to eliminate decayable (petrefiable) organic substances. However, it is becoming increasingly important that a so-called second stage be carried out, namely, nitrification. With the increase in use of fertilizers and detergents, a third stage of effluent purification, namely, the removal of nitrates and phosphates from the effluent is also receiving increased attention.

Purification plants in use at the present time are suitable principally to perform first-stage purification only. These are based on systems of drip-bodies, activated sludge and oxidation tanks. Purification plants of this type are expensive with respect to capital and running cost since they require continuous supervision, and consume undesirably large quantities of energy. Moreover, purification efficiency is generally low because they have little or no adaptability to deal with load fluctuations.

To effect the second stage of purification, recently, so-called effluent stabilizing tanks or pools have been proposed which utilize oxygen for the aerobic oxidation of the organic impurities. It has been suggested that the oxygen for these systems be produced mainly by photosynthesis, the organism responsive for the generation of oxygen consisting principally of green plants, seaweed, algae and autotrophic micro-organisms such as nitrifying bacteria. These organisms are capable of producing energy-rich organic substances from $CO_2$, water and certain inorganic nutritive salts with the help of light energy. The approximate equation of this process is as follows:

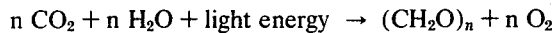

$$n\ CO_2 + n\ H_2O + \text{light energy} \rightarrow (CH_2O)_n + n\ O_2$$

This type of purification plant must cope with a fluctuating load; however, the ratio of treatable load to specific surface and therefore the purification efficiency is low, particularly in the colder seasons of the year. Efforts have been made to increase the amount of dissolved oxygen in the effluent by means of mechanical ventilation, but this manner of aerating is uneconomical since it requires a high energy input and cannot be adapted to the actual oxygen requirement at a given point in time. Moreover, this type of plant does not take into account the seasonal daily rhythmic fluctuations in the quantity of oxygen present or the actual impurity concentration of the effluent being treated, so that such treatment plants possess a relatively low efficiency, and are, in general, uneconomic.

The effluent stabilizing tanks which have been constructed up to the present time are of three different types, each involving a somewhat different process:

a. In the anaerobic tanks decomposition (putrefaction) processes take place, during which the sludge and the suspended organic impurities are degraded by anaerobic bacteria;

b. in the aerobic effluent stabilizing tanks organic impurities are degraded by aerobic, heterotrophic bacteria which utilize the oxygen produced during the degradation by algae; and c. in the so-called optional or auxiliary effluent stabilizing tanks, aerobic and anaerobic purifying processes take place respectively in the upper and lower zones of the tanks, in accordance with the daily and seasonal variation rhythm.

Stabilization tanks of these types suffer from drawbacks with regard to their construction, their spatial inter-relation, being, in general, independent, four-sided tanks, their accessory equipment and in flow patterns. Moreover, they are not as effective as desired in the removal of water and in addition, have disadvantages from the points of view of operational rate variations, energy consumption, running costs and construction techniques.

SUMMARY OF THE INVENTION

In the purification of polluted effluent by biodegradation, raw effluent is introduced into an auxiliary stabilizing tank from which it is transferred into an aerobic stabilizing tank. Photosynthesis generates oxygen in the latter tank, the oxygen then being responsible for break-down of the organic pollutants. Based on measurements which have shown that the oxygen concentration is at a maximum at an intermediate level in the effluent pool, effluent from the aerobic stabilizing tank is taken from a portion of the pool where the oxygen content is near maximum and recycled to the auxiliary stabilizing tank. Moreover, oxygen content is relatively high during day-light. Liquid for recycling to the auxiliary stabilizing tank is taken only during day-light and preferably at those periods in the day when day-light is strongest and the oxygen content is therefore at a maximum.

Accordingly, an object of the present invention is to provide an improved process of biological purification of domestic and industrial effluents containing biodegradable organic impurities.

Another object of the present invention is to provide a process of biological purification of domestic and industrial effluents containing biodegradable organic impurities wherein oxygen is produced by photosynthesis and the efficiency with which said oxygen is used for biodegradation is improved.

A further object of the present invention is to provide an improved process of biological purification of domestic and industrial effluents containing biodegradable organic impurities wherein oxygen is produced by photosynthesis in the second of two tanks and effluent from the second tank is recycled to a first tank so that biodegradation can proceed in the first tank into which raw effluent is initially supplied.

Yet another object of the present invention is to provide a process of biological purification of domestic and industrial effluents containing biodegradable organic impurities wherein effluent for recycling from the second tank to the first tank is taken from regions in the second tank where and at times when the oxygen concentration is near maximum.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

In accordance with the present invention, raw effluent is passed consecutively through an auxiliary stabilizing tank and an aerobic effluent stabilizing tank. Alternatively, effluent stabilization may be carried out in a row of such aerobic tanks, either in parallel or in series. The effluent is kept in the aerobic tank for a predetermined length of time, and a portion of the effluent from the aerobic tank is recycled to the auxiliary tank; the recycled portion is taken during that deily period when and from that level in the aerobic tank where the content of dissolved oxygen, produced largely by photosynthesis, is at or near its maximum value. The recycled portion may be mixed with fresh raw effluent entering the auxiliary tank or may be brought into the auxiliary tank by a separate duct.

Figure 1:
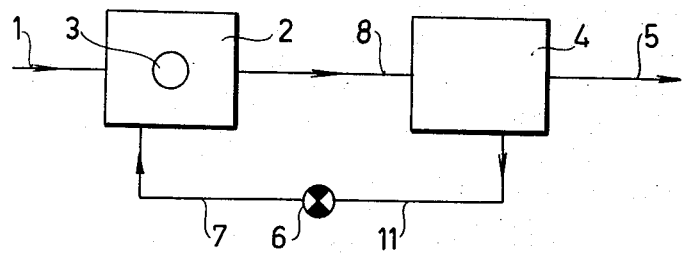
FIG. 1 is a flow diagram showing schematically the course of effluent in accordance with the present invention through an auxiliary stabilizing tank and an aerobic stabilizing tank.

Referring first to FIG. 1, raw untreated effluent which has previously been mechanical sedimented is introduced through pipe 1 into auxiliary stabilizing tank 2. Tank 2 has therein ventilator 3 by means of which air can be blown through the water in tank 2 in order to increase the dissolved oxygen content therein. Effluent passes from tank 2 through pipe 8 into aerobic stabilization tank 4. The effluent is taken through tank 4 very slowly. Depending on geographical and climatic conditions and the content of the effluent to be purified, the effluent should be kept in the tank for from 5 to 40 days, but at least for 2 days. During this period the slowly flowing effluent clarifies to the desired extent due to the aerobic processes proceeding therein. Clarified effluent is removed from the system through drain pipe 5.

Aerobic tank 4 is connected for recirculation to auxiliary tank 2 by way of a low pressure suction pipe 11 and a high pressure pipe 7, a central pumping station 6 being positioned between low pressure pipe 11 and high pressure pipe 7.

Figure 2:
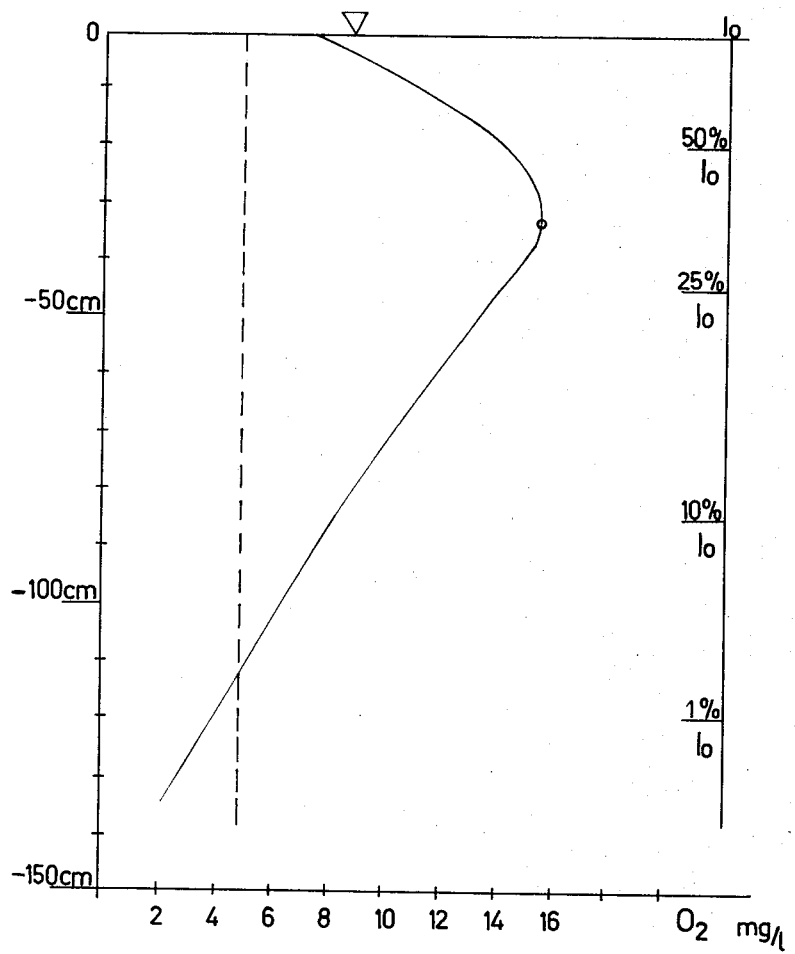
FIG. 2 shows the concentration of dissolved oxygen and the light intensity in an aerobic stabilizing tank as a function of the distance from the surface of the liquid in the tank.

As is shown in FIG. 2 the dissolved oxygen content, plotted in mg/l is a function of depth in the tank. The peak in the oxygen content is at about 35 cm below the top of the tank. Dissolved oxygen is near maximum concentration from about 20 cm to about 50 cm below the top of the effluent in the tank. At the right hand edge of FIG. 2 the light intensity in the tank, as a fraction of the light intensity at the top, is also plotted against depth in the tank. As can be seen, about 75 percent of the light falling on the surface of the effluent is absorbed within the first 50 cm.

The oxygen content in the effluent is also a function of the time of day. The peak period of dissolved oxygen content depends on the latitude and the season of the year. In central Europe, in summer, the peak period is from about 5 a.m. to about 7 p.m.

The efficiency of photosynthesis, and the related dissolved oxygen content is found under central European conditions to have an optimum value at a depth of about 30 –40 cm from the water surface at 2 p.m. In this layer the intensity of production of dissolved oxygen reaches its maximum value; therefore water for recirculation to the auxiliary stabilizing tank 2 should be taken from this region. Thus, it seems practical and expedient to conduct the recirculation daily at most during 12 –14 hours, but preferably only over the 2 –3 hours in which the dissolved oxygen concentration is at its peak, the oxygen content being principally due to photosynthesis taking place in the aerobic stabilizing tank. Thus, under the conditions described, it is recommended that effluent by recycled from about noon to about 3 p.m. from a depth of 20–50 cm below the surface of the pool of water.

In this period, the recirculation may be effected continuously or intermittently. If, during the peak period, the recirculation is effected over an extended interval, that is to say for about 10 hours, a periodic operation seems expedient, during which the pump may be programmed to switch on and off periodically. However, if the recirculation is to be effected over a short period such as 1 to 2 hours, then it is generally preferably to operate continuously. As aforesaid, the recirculated, oxygen-rich water may be transferred directly from pipe 7 into tank 2; alternatively, the recycled water may be mixed with raw effluent entering through pipe 1 — this arrangement is not shown in the figures. The advantage of recycling effluent to tank 2 is that degradation of the impurities commences in that tank, the algae population is increased and, owing to the dilution, the concentration of organic and toxic impurities is reduced. It has been found that conditions develop which are favorable for biochemical oxidation so that the degradation takes place at a high rate in auxiliary stabilizing tank 2. For optimum results, the quantity of effluent recycled should generally be in the range of 100 to 200 percent of the daily intake of raw effluent; recycling of effluent in this range of quantities ensures that the minimum quantity of oxygen need will be present and further provides for the optimum concentration of oxygen.

Where the quantity of oxygen generated in aerobic stabilizing tank 4 is inadequate, generally as the result of climatic conditions, it is necessary that additional oxygen be supplied. This is carried out by means of ventilator 3 which is a blower of any suitable type. The blower may be a turbine, or may be a high pressure oxygen supply. The artificial addition of oxygen will be required when the photosynthetic production of oxygen in the aerobic tank is limited and the oxygen concentration in the upper two-thirds of the water depth in the auxiliary tank 2 falls below 1 –2 mg per liter.

When the tanks are operated so that the dissolved oxygen content is at least as great as the specified minimum, then the effluent taken from tank 2 through pipe 8 may be as much as 50 percent degraded.

It is expedient to conduct the recirculation through a program-controlled and automated pumping apparatus, that is, to set the beginning and endpoints of the pumping period with a time programmer, or to switch the pumping on and of when the operation is intermittent. The artificial ventilating means 3 may similarly be actuated by automatic electric remote control. The information for the remote control is delivered by a monitoring device (not shown) immersed in the effluent and arranged to register the dissolved oxygen content continuously. The ventilating means 3 may then be actuated by a two position, upper and lower threshold value switch (not shown), or by proportional control, etc.

Figure 3:
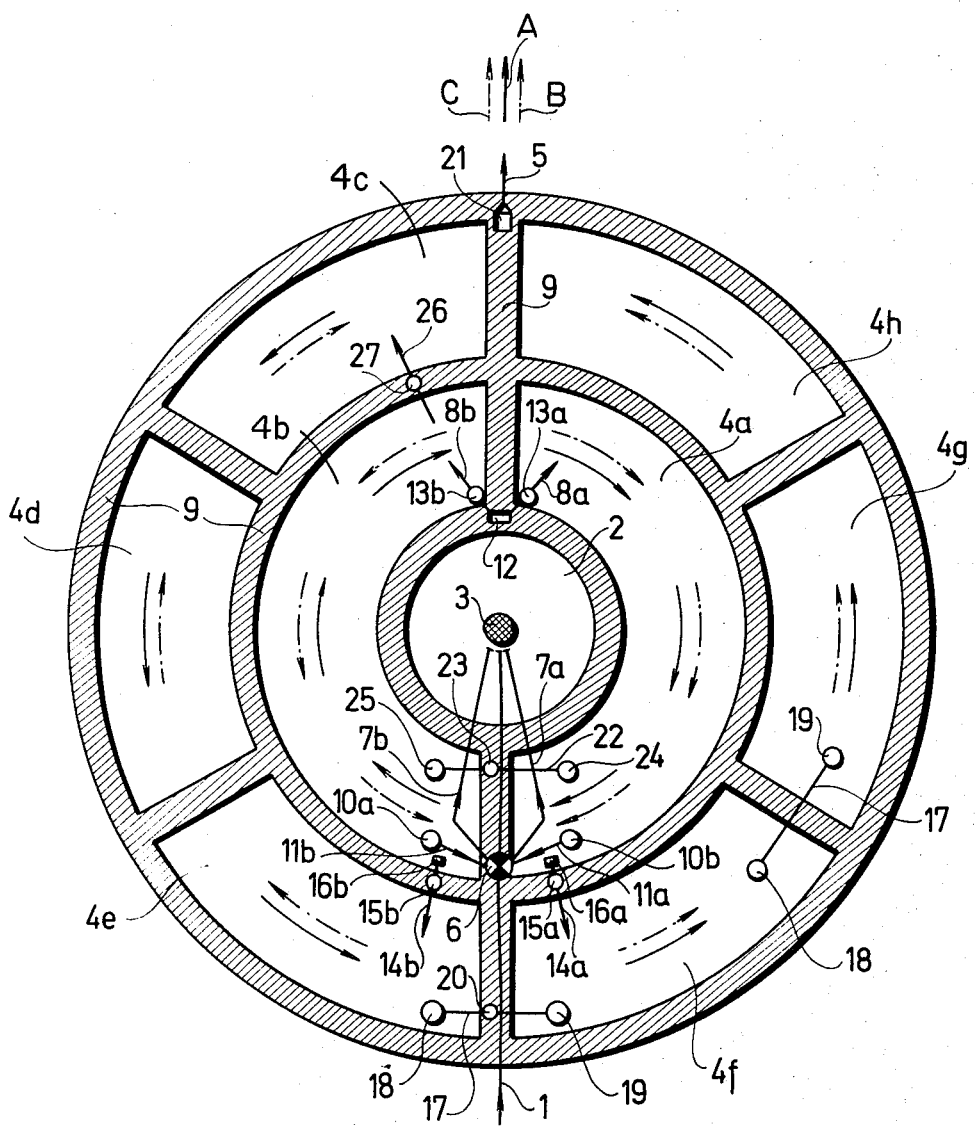
FIG. 3 is a plan view of a circular auxiliary stabilizing tank and multiple aerobic stabilizing tanks arranged in concentric rings around the auxiliary stabilizing tank, on which are indicated modes of transferring effluent through the tanks.

An apparatus suitable for carrying out the above-described process according to the invention, is shown in FIG. 3 where arrows indicate the direction of effluent flow in the various tanks and pipes. The full lines refer to flow system A, and the broken lines refer to flow systems B and C. Raw effluent enters auxiliary tank 2 through pipe 1; ventilating means 3, secured in position by floats is preferably mounted at the center of tank 2 which is cylindrical. Aerobic tanks 4a and 4b are equal in size and have the shape of half rings. They surround tank 2 concentrically. Tanks 4a and 4b are designated row I and are separated from each other by walls or dams 9 covered by rigid covers. The walls 9 may be of any suitable material such as earth, concrete or pre-stressed concrete.

Aerobic tank row I is surrounded by concentric outer aerobic tank ring II consisting of six equal-sized tanks 4c to 4h. The operational water depth of the auxiliary tank is typically about 3.0 m, that of the aerobic tank row I is 1.3 to 1.8 m and that of row II is 1.0 to 1.5 m. It is preferred that the volume of the tanks be such that of the total effluent residence time, 5 percent is spent in the auxiliary tank 2, 50 percent in the tank row I and 45 percent in the tank row II.

In the arrangement shown in FIG. 3, raw effluent inlet pipe 1 enters auxiliary tank 2 within the lower third section of the latter and the pipe end is close to the geometric center axis of the tank. Pumping station 6 is built into dam 9 at the contact point of the tanks 4a and 4b adjacent inlet pipe 1. Pumping suction pipes 11a and 11b of the pump units are fastened to floats 10a and 10b made of a corrosion resistant material such as glass-fiber reinforced polyester so as to ensure that the pipe ends which are funnel-shaped will remain at all times at the water depth corresponding to the optimum photosynthetic intensity irrespective of variations in water levels. Consequently, the floating arrangement of the pipes will at all times ensure that water recirculated from tanks 4a and 4b into tank 2 will always contain a quantity of dissolved oxygen which is near maximum. The recirculation from the aerobic tanks 4a and 4b to the auxiliary tank 2 may also take place through pipes 7a and 7b in a mutually independent manner. Pipes 7a and 7b have diffusor-shaped ends (not shown) which are so oriented that the flow into the tank 2 will be in an upward direction. Pipes 7a and 7b terminate near the center of tank 2 but are in the lower third thereof.

Effluent, largely freed of organic impurities, passes from auxiliary tank 2 to the bottom region of aerobic tanks 4a and 4b by way of duct 12 and pipes 8a and 8b respectively provided with sliding shut-off cocks 13a and 13b.

From the aerobic tank row I, the water layer lying near the surface, which is at least partly clarified and is oxygen-enriched is ducted to the bottom region of tanks 4e and 4f of areobic tank row II by way of movable pipes 14a and 14b. Pipes 14a and 14b have funnel-shaped ens and are provided with respective sliding shut-off cocks 15a and 15b. The pipe ends are secured respectively to floats 16a and 16b whereby it is ensured that water is at all times and irrespective of variations in water level taken from tanks 4a and 4b at the optimum depth of 30 to 40 cm below the water surface.

For the sake of clarity, only the pipes of tanks 4f and 4g and of 4e and 4f are shown in the drawing. The individual members of aerobic tank row II are connected to a movable connecting pipe 17 whose ends are secured to floats 18 and 19. A sliding shut-off cock 20 between tanks 4e and 4f is provided in the pipe 17. Further pipes 17 with cocks may be secured to floats and arranged between the aerobic tanks 4a and 4b.

For inlet of water from auxiliary tank 2, the tanks 4a and 4b are connected to a pipe 22 having a built-in sliding shut-off cock 23 and having end pieces secured to floats 24 and 25. On the opposite side, tank 4b is connected to tank 4c of row II by way of rigid pipe 26 which is provided with a sliding cock 27. The regulation of the water level in the tank row II and the draining of the clarified effluent are effected through drain pipe 21.

The operation of the apparatus shown in FIG. 3 is as follows. The raw effluent, in known manner, is mechanically sedimented in a tank (not shown) and introduced through pipe 1 into the auxiliary tank 2, where there is already a sufficient amount of dissolved oxygen available to initiate biochemical oxidation, the oxygen having been produced chiefly through recirculation from the aerobic tank and/or through actuation of the ventilating means 3. The raw effluent is kept in the tank 2 for at least two days; this residence time is, of course, variable depending on climatic conditions and/or on other local circumstances and/or on the concentration of the effluent. Thereafter, the effluent is led from the auxiliary tank 2 through dividing duct 12 and the pipes 8a and 8b to the bottom region of the aerobic tanks 4a, 4b of the row I. This can be done either to one or both tanks of row I, depending on whether the apparatus is connected in series or in parallel. It must be remarked upon that the depth of water, and thus the storage volume, as well as the residence time and through flow time of the effluent in the rows I and II are all variable. An increase in the operational water level may be controlled through an automatic float arrangement, and may be regulated by a sluice and overflow piping (not shown).

Figure 4:
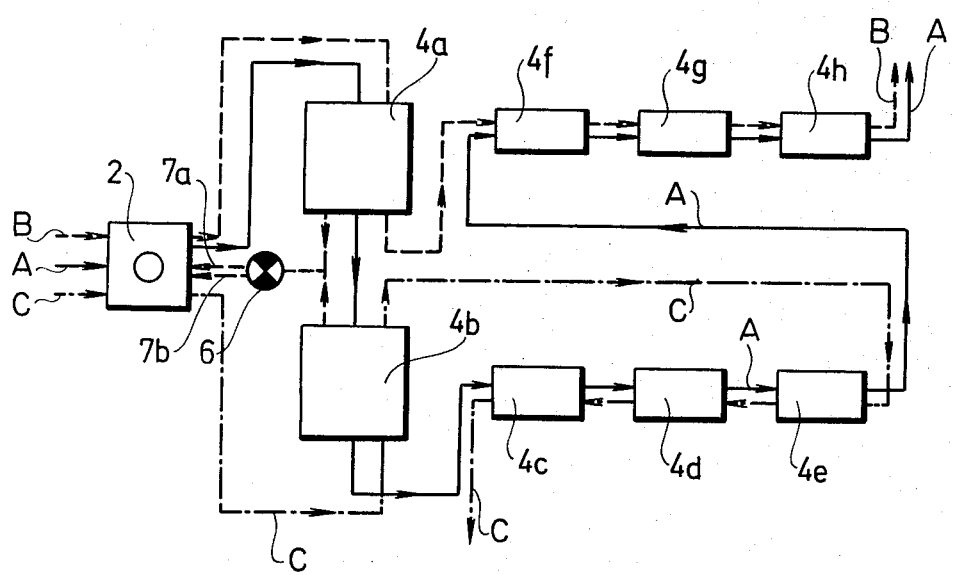
FIG. 4 is a block diagram of an arrangement of tanks in which the course of the liquid through the tanks is the same as in FIG. 3.

The layout shown in FIG. 4 also indicates the possibilities of series and parallel connections. In the series-connected layout the effluent flows consecutively through all the tanks and the concentration of impurity diminishes tank by tank, theoretically by an amount approaching 50 percent of that of the immediately preceding tank. For this reason, series-connection is used for effluents of high impurity content, e.g., industrial effluent. In contrast, parallel-connected systems provide the possibility of disconnecting half the plant (e.g., for maintenance or repair) or of separately actuating both halves of the apparatus, should this be required from hydraulic considerations or by the nature of the impurities.

The series-connected flow is shown by the arrowed lines A from duct 12 to pipe 8a only into aerobic tank 4a from tank 2; by opening cock 23, the effluent then flows into the aerobic tank 4b. Next, by opening cock 27 in pipe 26, the effluent is passed from tank 4b to tank 4c of row II, and goes serially through all the other tanks 4d to 4h of row II via the respective connecting pipes 17. From tank 4h the thus fully clarified water, i.e., clarified to the third purification stage, is passed to a container (not shown) via drain duct 21. Of course, if desired, the serial flow could with the same result take place in the opposite direction, i.e., from 2 to 4b to 4f and so on to 4e and 21.

This oppositely directed serial flow is not shown in FIG. 4 for the sake of ease of interpretation of that figure.

The parallel-connected operation of the plant may be carried in two separate ways respectively as shown by the arrowed broken lines B and the arrowed broken lines C. In the flow system B, cock 13b of pipe 8b remains closed and its opening renders flow system C operational. Thus in system B flow is from tank 2, through pipe 8a, aerobic tank 4a, pipe 14a with cock 15a open, serially through aerobic tanks 4f, 4g, and 4h and their connecting pipes 17 and out via duct 21. The relative residence times in tanks 2, 4a and 4f to 4g are about 5:50:45. In the flow system C, flow is via tank 2, tank 4b, and then reverse serial flow through tanks 4e, 4d and 4c and out. Thus in the parallel-connected system, oxygen-enriched effluent can be recirculated from both aerobic tanks 4a and 4b simultaneously, when both flow lines B and C are actuated.

When it is not possible to provide the minimum value of the range of optimum oxygen content by recirculation alone, then the ventilator 3 is actuated via an electrically operated program device which accurately monitors the actual content of dissolved oxygen.

The apparatus according to this invention is not limited to the above-described alternative. For example, several parallel connecting pipes may be provided between individual tanks; the concentric arrangement of, the number of, tanks may be varied; the shut-off valve system may be changed, e.g., by using automatic shut-off valves.

The invention as described with reference to the drawings leads to numerous advantageous and new multiple effects not previously obtainable. Thus significant energy, and overall cost, savings are made by using oxygen predominantly photosynthetically produced by the micro-organisms and algae living in the recirculated water, while additional aeration or oxygenation produced by ventilation is only used in cold weather. The intermittent or periodic recirculation of water during the optimum period, taken from the optimum depth, provides favorable conditions for biochemical oxidation in the auxiliary tank. This recirculation also causes layers of water lying at photosynthetically unfavorable depths to reach the region near the surface, which further increases the effectiveness of photosynthesis. In this way the overall efficiency and the specific loadability of the system are increased. Moreover, the system is more reliable, the achievable purification efficiency more favorable and more uniform than in known systems. Third-stage purification is ensured in this system which can be fully automated. The preferred embodiment of the apparatus of this invention requires less ground space, its building or construction is simpler than hitherto, and thus significant capital cost savings result. Its advantageous flow and operating technology favorably influence running costs as well as maintenance. For instance, through the variable operational water level and increasable storage capacity of the illustrated apparatus, a clarified effluent container may, if necessary, be partly or fully freed from receiving flow for a time so that it may be maintained.

It will thus be seen that the objects set forth above, among those made apparent from the preceding description, are efficiently attained and, since certain changes may be made in carrying out the above method without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all stagements of the scope of the invention which, as a matter of language, might be said to fall therebetween.

What is claimed is:

1. A process of biological purification of domestic and industrial effluents containing biodegradable organic impurities, comprising the steps of feeding a mechanically sedimented raw effluent into the bottom third of an auxiliary stabilizing tank, maintaining said effluent in said auxiliary stabilizing tank for a first predetermined residence term, transferring said effluent from said auxiliary stabilizing tank into an aerobic stabilizing tank substantially larger than said auxiliary stabilizing tank, said aerobic tank containing organisms capable of generating by photosynthesis the bulk of the oxygen needed for purification of said effluent, causing oxygen to be generated in said aerobic stabilizing tank by said organisms through photosynthesis, keeping said effluent in said aerobic stabilizing tank for a second predetermined residence term, removing a portion of the effluent from said aerobic stabilizing tank, said portion being taken from that region of said aerobic stabilizing tank between 20 and 50 cm below the surface thereof and during a period in that part of the day when said oxygen in dissolved form in said region is near its maximum value, said portion being from 100 percent to 200 percent of said raw effluent feed, recycling said portion by introducing the same upwardly into the bottom third of said auxiliary stabilizing tank, and removing treated effluent from said aerobic stabilizing tank, said process being free of any requirement for mechanical circulation of the effluent in either tank, said second residence term being from 2 to 40 days, said first residence term being related to said second residence term in the ratio of 5:95.

2. A process as defined in claim 1, wherein said recycling is carried out during a period ranging from about 1 hour to about 14 hours.

3. A process as defined in claim 2, wherein said period is from about 2 hours to about 3 hours.

4. A process as defined in claim 1, wherein said second residence term is from about 5 to about 40 days.

5. A process as defined in claim 1, further comprising the step of forcing air through the effluent in said auxiliary stabilizing tank to increase the oxygen content thereof when the oxygen concentration in the upper two thirds of the auxiliary stabilizing tank falls below 1 −2 mg per liter due to unfavorable climatic conditions causing limited oxygen generation in said aerobic stabilizing tank.

6. A process as defined in claim 5, wherein said air is forced through said effluent by means of a blower.

7. A process as defined in claim 5, wherein air is forced through the upper two-thirds of the effluent in said auxiliary stabilizing tank.

8. A process as defined in claim 1, wherein said recycling is effected by a program-controlled pump.

9. A process as defined in claim 1, wherein said raw effluent is introduced into said auxiliary stabilizing tank in the plane of the geometrical center point thereof.

10. A process as defined in claim 1, wherein said recycled effluent is mixed with said raw effluent prior to entering said auxiliary stabilizing tank.

11. A process as defined in claim 1 wherein said auxiliary stabilizing tank is essentially circular, and said aerobic stabilizing tank comprises a plurality of individual tanks generally surrounding said auxiliary tank, said individual tanks generally surrounding said auxiliary tank, said individual tanks being connectable to provide essentially linear flow either in series or parallel flow therethrough.

* * * * *